United States Patent [19]

Shaffer et al.

[11] 3,909,443

[45] Sept. 30, 1975

[54] CALCIUM LITHIUM SILICATE PHOSPHORS

[75] Inventors: Francis N. Shaffer, Towanda, Pa.; Dominic T. Palumbo, deceased, late of Towanda, Pa., by Frances A. Palumbo, administratrix, Towanda, Pa.

[73] Assignee: GTE Sylvania Incorporated, Stamford, Conn.

[22] Filed: Aug. 16, 1973

[21] Appl. No.: 388,941

[52] U.S. Cl. .................................. 252/301.4 F
[51] Int. Cl.$^2$ ................ C09K 11/12; C09K 11/20; C09K 11/16; C09K 11/34
[58] Field of Search ............................ 252/301.4 F

[56] References Cited
UNITED STATES PATENTS

| | | | |
|---|---|---|---|
| 2,297,108 | 9/1942 | McKeag et al. | 252/301.4 F |
| 2,457,054 | 12/1948 | Leverenz | 252/301.4 F |
| 2,542,349 | 2/1951 | Ouweltjes | 252/301.4 F |
| 2,719,128 | 9/1955 | Kressin | 252/301.4 F |
| 2,736,711 | 2/1956 | Gooding et al. | 252/301.4 F |
| 3,420,781 | 1/1969 | McAllister | 252/301.4 F |
| 3,663,474 | 5/1972 | Lee et al. | 252/301.4 F |

OTHER PUBLICATIONS

Kroger, "Some Aspects of the Luminescence of Solids," Ekevier Publish. Co., 1948, pp. 270, 271, 272, 275, 276, 279, 280, 288, 289, 292 and 297.

Komstantinova et al., "Chemical Abstracts," Vol. 68, 1968, p. 64278h.

Primary Examiner—Jack Cooper
Attorney, Agent, or Firm—Norman J. O'Malley; William H. McNeill; Donald R. Castle

[57] ABSTRACT

Phosphor compositions in the ternary system $Li_2O$-$CaO$-$SiO_2$. Activation is supplied by replacing a part of the calcium with one or more activator metals selected from the group consisting essentially of lead, cerium, europium, terbium, indium, tin or manganese. The phosphors are generally UV excitable and some show emission under cathode ray excitation as well. The emission spectra runs the gamut from short wave length ultraviolet to green depending upon composition and activator selected.

3 Claims, 2 Drawing Figures

CALCIUM LITHIUM SILICATE PHOSPHORS

BACKGROUND OF THE INVENTION

This invention relates generally to phosphor compositions useful in fluorescent lamps. The phosphors have new crystal structures which have not previously been reported by ASTM. In particular, it relates to fired materials selected from the ternary system of $Li_2O$-$CaO$-$SiO_2$ with part of the calcium replaced with an activator metal or a combination of activator metals. The composition ratios can range from 1:1:1 to 4:3:5 to 2:3:3 to 1:2:2. At the 1:1:1 ratio a novel crystal structure is formed, which crystal structure is, for purposes of this disclosure, given the designation X. At the remaining ratios a different, two phase crystal structure is formed, the two phases being designated for purposes of this disclosure, as Y and Z.

Various calcium silicates are reported phosphors. It is also known that various manganese and/or cerium activated metal oxide lithium silicate phosphors wherein the metal oxides include the oxides of cadmium, zinc, barium and strontium have also been reported. Compounds such as are disclosed and claimed in this application have not been recorded by ASTM. Further, several specific combinations of the instant compounds provide extremely strong emission with a narrow bandwidth (about 18 nm) with a strong peak at 295 nm under 254 nm excitation. Such narrow width high peaking short wave length emitting phosphors are rare.

The compositions at the 4:3:5 to 2:3:3 to 1:2:2 ratios activated with about 0.2 mole percent lead and when fired at about 870°C have mainly the mixed Y and Z crystal structure. These compositions have strong (about 45 nm bandwidth) band emission peaking at about 330 nm under 254 nm excitation. To date it has not been possible to produce pure separate Y or Z structural phases or a mixed phase completely free of $Li_2$-$SiO_3$.

A 1:1:1 $Li_2O$-$CaO$-$SiO_2$, X crystal structure fired composition having a small part of the calcium replaced with cerous-cerium, has over a broad range of ultraviolet excitation, strong long wavelength ultraviolet emission at about 380 nm and with divalent europium substituted for the cerous-cerium has medium intensity emission in the blue-green region at about 480 nm.

Spark discharge tube excitation or cathode ray excitation produces medium intensity green emission with a unique long lag, but ultraviolet excitation produces essentially no emission in the new X crystal structure 1:1:1 $Li_2O$-Ca, Mn, $O$-$SiO_2$; lithium, calcium-manganese orthosilicate. However, manganese, when sensitized with $Ce^{3+}$ or $Pb^{2+}$ as a primary activator in the system, produces green manganese emission along with subdued (compared with no manganese similar composition) short wavelength emission of the respective sensitizing primary activator when excited by an appropriate range of ultraviolet or by spart discharge tube or cathode rays.

Activator such as indium, tin and terbium produce measurable luminescence in one or both of the new X or Y-Z crystal structure materials.

Such compositions provide a unique advance in the art.

DESCRIPTION OF THE PREFERRED EMBODIMENTS

For a better understanding of the present invention together with other and further objects, advantages and capabilities thereof, reference is made to the following disclosure and appended claims in conjunction with the above-described drawings.

Referring now to the invention with greater particularity, lithium carbonate, calcium carbonate, lead oxide and silicic acid are weighted out in amounts corresponding to a mole ratio of 1.0 $Li_2CO_3$, a total of 1.0 combined $CaCO_3$, plus PbO and 1.0 $SiO_2$. Any mixture of starting materials that, when fired, will form $Li_2O$-Ca, Pb, $O$-$SiO_2$ at close to 1:1:1 mole ratios can be used without departing from the scope of the invention. There are indications that PbO performs better than some other lead compounds. The lead concentration may vary from about 0.05 to 1.5 mole percent of the total calcium plus lead formulated contents. At the preparation conditions employed hereinbelow the strongest emission was obtained at 0.2 ± 0.1 mole percent lead.

The pre-fired mixture is rendered homogeneous by dry bead blending in a jar on a Spex Mixer Mill or by blending in a V-blender or by blending in a suitable container and then passing through a Mikro Pulverizer, or by pebble milling as an acetone slurry or by other suitable means. When acetone is used in the prefired mixture it is removed by an evaporation step in a drying oven prior to the firing step.

The now premixed homogeneous blend is placed in boats or crucibles and fired at about 900°C. Excellent 1:1:1 $Li_2O$-Ca, Pb, $O$-$SiO_2$ material can be obtained by a two step firing procedure. The first step is to fire the pebble milled dried pulverized starting material for 1 to 1½ hours at 900°C, cooling and then breaking up the fired cake and refiring it again for 1½ hours at 900°C. The firing atmosphere may be air or nitrogen. Alundum crucibles have proven to be entirely satisfactory firing containers. The above-cited mixing and firing ranges and ratios will produce the new X crystal structure. Emission will depend upon the activator material selected.

The X crystal structure material can be identified readily from its X-ray diffraction pattern which has the following identifying features:

| d-Values | Intensity |
| --- | --- |
| 3.56 A (Angstroms) | 50 |
| 3.24 " | 7 |
| 2.52 " | 4 |
| 2.40 " | 59 |
| 2.13 " | 14 |
| 1.99 " | 18 |
| 1.78 " | 13 |
| 1.655 " | 2 |
| 1.621 " | 2 |
| 1.587 " | 5 |
| 1.496 " | 2 |
| 1.451 " | 14 |
| 1.381 " | 8 |

-Continued

| d-Values | Intensity |
| --- | --- |
| 1.276 " | 1 |
| 1.216 " | 1 |
| 1.212 " | 2 |
| 1.202 " | 2 |
| 1.187 " | 2 |
| 1.148 " | 3 |
| 1.139 " | 2 |
| 1.127 " | 1 |
| 1.074 " | 2 |
| 1.042 " | 1 |
| 1.002 " | 1 |
| .997 " | 1 |
| .953 " | 2 |
| .931 " | 2 |
| .899 " | 1 |

Figure 1:
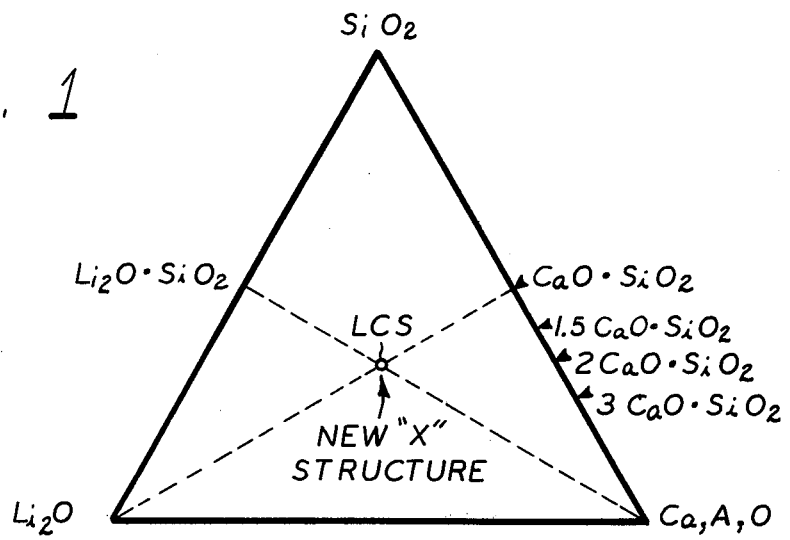
FIG. 1 is a phase diagram of the 1:1:1 compositions.
Figure 2:
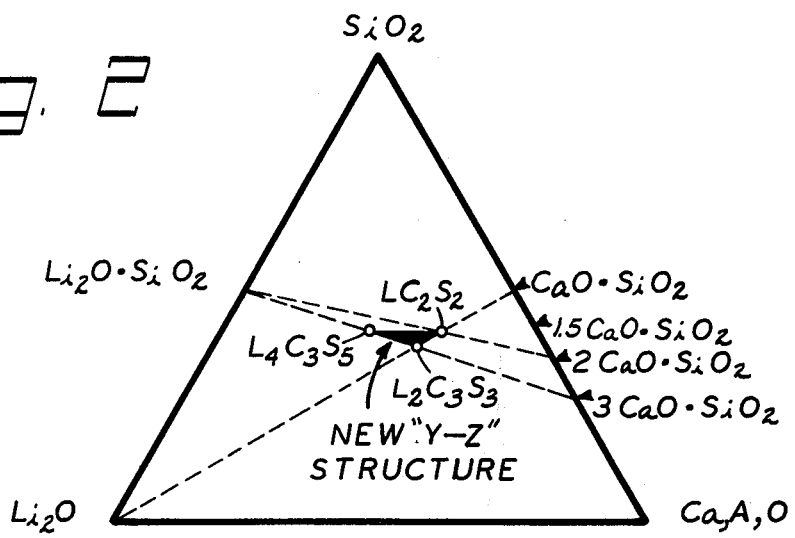
FIG. 2 illustrates a phase diagram depicting the range of compositions to formulate the Y-Z crystal structures.

The Y-Z phase is produced by following the general procedure given above except that the composition must be close to the triangular area bounded by the 4:3:5 to 2:3:3 to 1:2:2 composition points shown by the triangular area in FIG. 2 and the firing temperature should be about 870°C.

Particular examples of the preparation of the various phosphors are described below:

EXAMPLE 1

Weigh the following materials into a 15 ml mixing jar designed to fit a Spex Mixer Mill:

|  | Mole Ratio | Batch Grams |
| --- | --- | --- |
| $Li_2CO_3$ | 33.3 | 2.46 |
| $Ca(NO_3)_2 \cdot 4 H_2O$ | 33.1 | 7.82 |
| $Pb(NO_3)_2$ | 0.2 | 0.07 |
| $SiO_2 \times H_2O$ (90% $SiO_2$) | 33.3 | 2.22 |

Add three plastic beads to the material in the mixing jar to facilitate blending and blend it on a Spex Mixer Mill about three minutes and then remove the beads from the blended mix. Fire a full 30 ml crucible of the blended mix 1.5 hours at 900°C and then cool to room temperature. Break up the fired material with mortar and pestle and fire it again for 1 to 16 hours at 900°C. The firing atmosphere may be nitrogen or air. Break up the fired material with mortar and pestle. At this stage, the material at the formulated composition 1 $Li_2O$:1 Ca, Pb, 0:1 $SiO_2$(0.2 mole percent PbO) will have the new X crystal structure and strong (about 18 nm bandwidth) band emission peaking at about 295 nm under about 254 nm excitation.

EXAMPLE 2

Weigh the following materials into a one-quart pebble mill containing a standard charge of flint pebbles:

|  | Mole Ratio | Batch Grams |
| --- | --- | --- |
| $Li_2CO_3$ | 1.00 | 73.89 |
| $CaCO_3$ | 0.998 | 99.89 |
| PbO | 0.002 | 0.45 |
| $SiO_2 \times H_2O$ (85.5% $SiO_2$) | 1.00 | 70.25 |

Add 500 ml acetone to the mill and then roll it covered at 75 rpm for 16 hours. Then with mill cover off and rubber mill gasket set aside, oven dry the mill and contents for 5 or more hours at 120°C to evaporate off the acetone. Then separate the powder mixture from the mill and pebbles. This can be done by sifting the mill contents on a 4-mesh screen. Fire the material from one mill charge, divided between two (about 200 ml volume) alundum crucibles, for 1.5 hours at 900°C in an electric box furnace. Allow the crucibles of fired material to cool to room temperature outside of the furnace. Then break up the material with mortar and pestle and sift it through a 60 mesh sieve. Then fire the material again, this time in one (about 200ml volume) alundum crucible, for 1.5 hours at 900°C. When cooled and then broken up by mortaring or other suitable means, the material at the formulated composition 1.0:1.0:1.0-$Li_2O$:Ca, $Pb_xO$:$SiO_2$ (0.2 mole percent PbO) will have the new X crystal structure and strong (about 18 nm bandwidth) band emission peaking at about 295 nm under 254 nm excitation. Its absolute density will be 2.95 g per ml.

EXAMPLE 3

Weigh the following materials into a one-quart pebble mill:

|  | Mole Ratio | Batch Grams |
| --- | --- | --- |
| $Li_2CO_3$ | 1.000 | 36.95 |
| $CaCO_3$ | 1.996 | 100.00 |
| PbO | 0.004 | 0.45 |
| $SiO_2 \times H_2O$ (90% $SiO_2$) | 2.000 | 66.75 |

When processed under the same procedure given for Example 2 except being fired at about 30°C lower temperature the material, at the formulated composition ratio 1.0:2.0:2.0 -$Li_2O$:Ca,Pb,O: $SiO_2$ (0.2 mole percent PbO), will have mainly the new Y and Z crystal structure phases and strong (about 45 nm bandwidth) band emission peaking at about 330 nm under 254 nm excitation. Its absolute density will be 2.93 g/ml.

EXAMPLE 4

Weigh the following materials into a one-quart pebble mill:

|  | Mole Ratio | Batch Grams |
| --- | --- | --- |
| $Li_2CO_3$ | 1.00 | 73.90 |
| $CaCO_3$ | 0.98 | 98.10 |
| $Ce_2(C_2O_4)_3 \cdot 9 H_2O$ | 0.01 | 7.05 |
| $SiO_2 \times H_2O$ (90% $SiO_2$) | 1.00 | 66.75 |

Acetone pebble mill and then oven dry the 1-mole batch composition using the same general procedure given in Example 2. First-step-fire the acetone-milled, oven-dried material at about 880°C. When cool, break up and blend the fired cake and fire it again at about 885°C. The atmosphere for the final firing and cooling step must be such as to maintain the cerium activator in the 3+ state. For the first firing and cooling step, a nitrogen atmosphere is suitable and for the second firing and cooling step about 1% hydrogen, hydrogen-nitrogen mixed atmosphere is suitable with both firing and cooling steps carried out in a tube furnace. The finally fired Example 4 material will have two strong overlapping emission bands at about 380 nm at a combined bandwidth of about 55 nm over a long range of ultraviolet excitation.

EXAMPLE 5

A composition prepared similar to Example 4 except at 1:2:2-$Li_2O$:Ca, Ce,O:$SiO_2$ ratio will have two overlapping emission bands at about 415 nm at about 70 nm bandwidth.

EXAMPLE 6

A composition prepared similar to Example 4 except with about 2 mole percent divalent europium substituted for the 0.2 mole cerous-cerium and with the final firing step carried out in about 10% $H_2,N_2$-$H_2$ atmosphere will have medium intensity bluegreen emission at about 480 nm at about 30 nm bandwidth.

EXAMPLE 7

A composition prepared similar to Example 5 except with stannous-tin substituted for cerous-cerium will have medium intensity blue emission at about 450 nm at about 80 nm bandwidth.

EXAMPLE 8

Weigh the following materials into a one-quart pebble mill:

|  | Mole Ratio | Batch Grams |
| --- | --- | --- |
| $Li_2CO_3$ | 1.00 | 73.90 |
| $CaCO_3$ | 0.95 | 95.10 |
| Mn Carb. (44.8% Mn) | 0.05 | 6.15 |
| $SiO_2 \times H_2O$ (90% $SiO_2$) | 1.00 | 66.75 |

When processed by the same procedure given for Example 4, the material will have medium intensity green emission with long lag under spark discharge tube excitation or under cathode ray excitation. If process by the procedure used in Example 2 with 0.002 mole ratio PbO included in the prefired mix, the material will emit green under 254 nm excitation as well as by spark discharge tube or cathode ray excitation.

While there have been shown and described what are at present considered the preferred embodiments of the invention, it will be obvious to those skilled in the art that various changes and modifications may be made therein without departing from the scope of the invention as defined by the appended claims.

What is claimed is:

1. A crystalline luminescent composition of matter having a host matrix of $Li_2O$, CaO, and $SiO_2$ with part of said calcium being replaced by an activator, the proportions of $Li_2O$:CaO + activator:$SiO_2$ in said composition being selected from the group consisting of: a mole ratio of 1:1:1; and a composition wherein said $Li_2O$ is present at from 20 to 33 1/3 mole percent, said CaO plus activator is present at from 25 to 40 mole percent and said $SiO_2$ is present at from 37.5 to 41 2/3 mole percent; said activator being lead and being present in an amount from 0.05 to 1.5 mole percent.

2. A crystalline luminescent composition of matter having a host matrix of $Li_2O$, CaO, and $SiO_2$ with part of said calcium being replaced by an activator, the proportions of $Li_2O$:CaO + activator: $SiO_2$ in said composition being selected from the group consisting of: a mole ratio of 1:1:1; and a composition wherein said $Li_2O$ is present at from 20 to 33 1/3 mole percent, said CaO plus activator is present at from 25 to 40 mole percent and said $SiO_2$ is present at from 37.5 to 41 2/3 mole percent; said activator being lead and being present in an amount of 0.2 mole percent plus or minus 0.1 mole percent.

3. A crystalline luminescent composition of matter consisting essentially of $Li_2O$, CaO plus activator, and $SiO_2$ in a mole ratio of 1:1:1; said activator consisting of from 0.1 to 10.0 mole percent manganese and from 0.05 to 1.5 mole percent lead.

* * * * *